Figure 2:
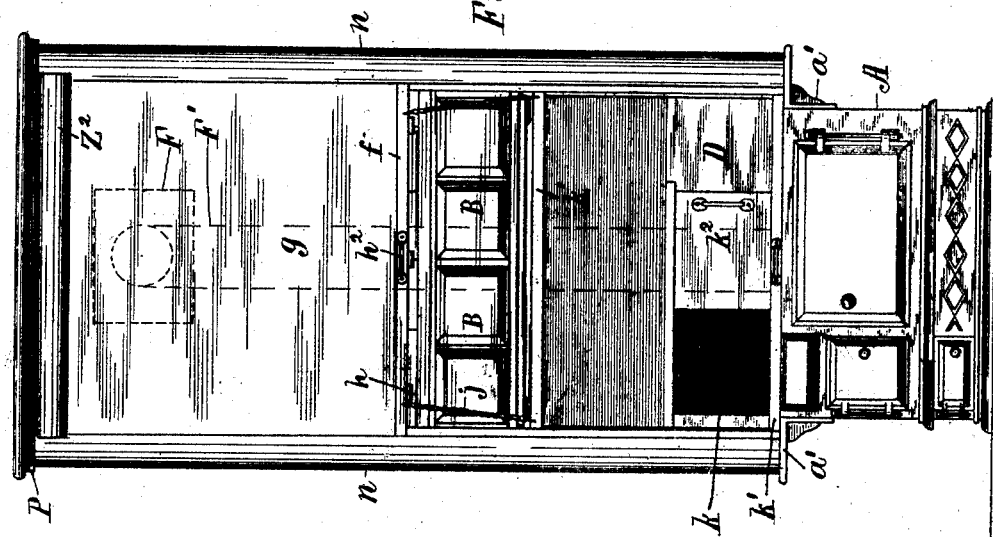

(No Model.) 3 Sheets—Sheet 1.

B. F. CARPENTER.
MOVABLE HOOD FOR STOVES OR RANGES.

No. 503,343. Patented Aug. 15, 1893.

Attest:
L. Lee,
Edw. P. Kinsey.

Inventor.
Benjamin F. Carpenter,
per Crane & Miller, Attys.

(No Model.)  3 Sheets—Sheet 2.

B. F. CARPENTER.
MOVABLE HOOD FOR STOVES OR RANGES.

No. 503,343. Patented Aug. 15, 1893.

Attest:
L. Lee.
Edw. F. Kinsey

Inventor.
Benjamin F. Carpenter,
per Crane & Miller, Attys.

(No Model.) 3 Sheets—Sheet 3.
B. F. CARPENTER.
MOVABLE HOOD FOR STOVES OR RANGES.
No. 503,343. Patented Aug. 15, 1893.
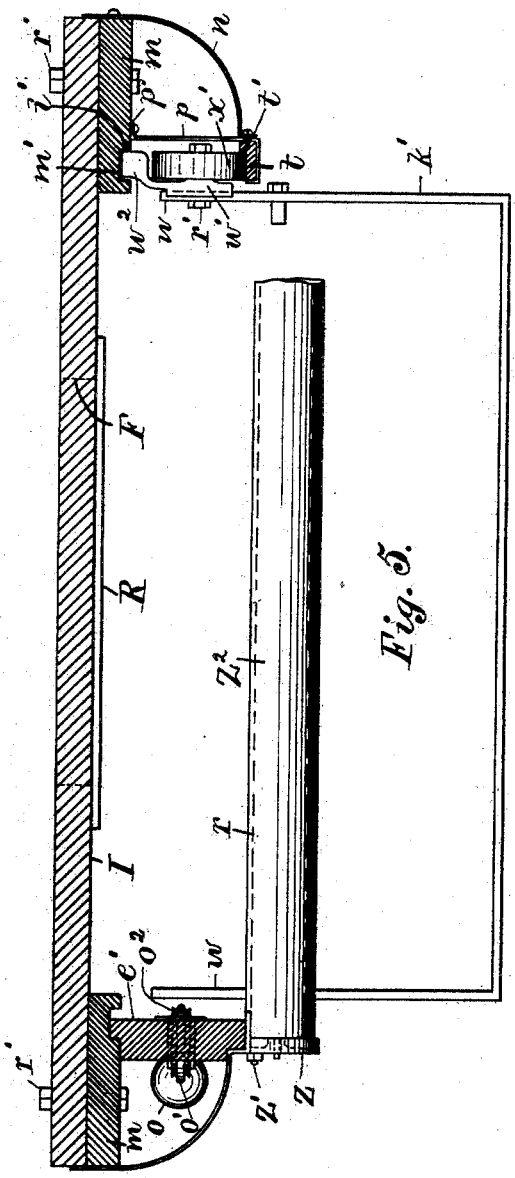
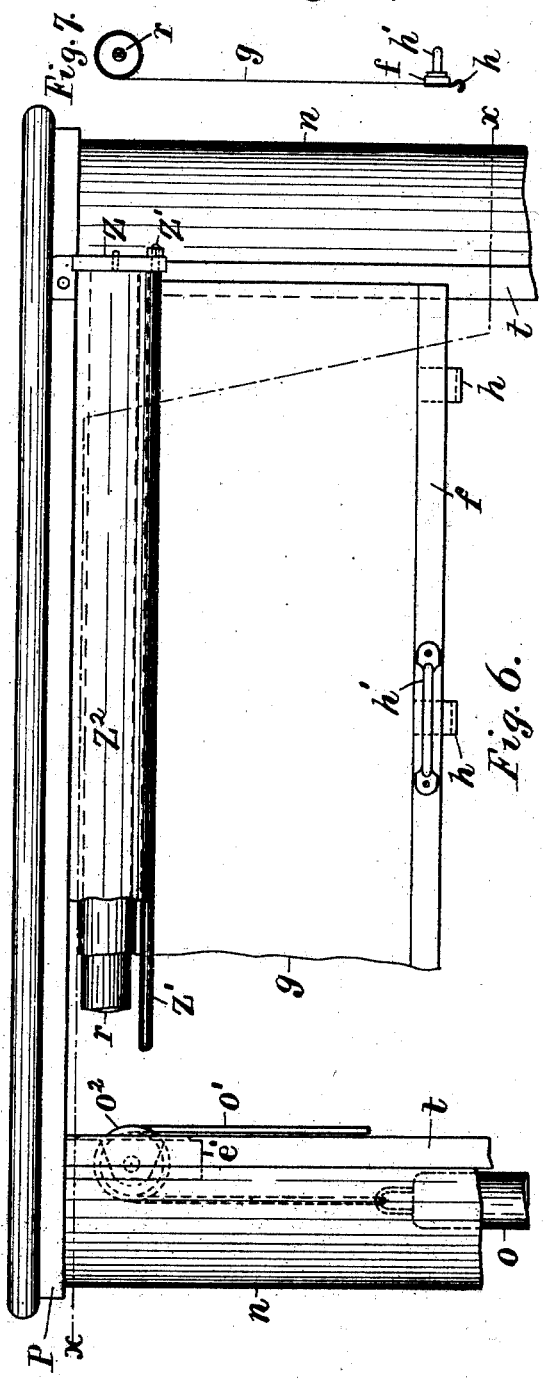
Attest:
L. Lee.
Edw. F. Kinsey.
Inventor.
Benjamin F. Carpenter,
per Crane & Miller, attys.

UNITED STATES PATENT OFFICE.

BENJAMIN F. CARPENTER, OF ROSELLE, NEW JERSEY, ASSIGNOR TO THE HEAT AND ODOR EXTINGUISHER COMPANY, OF NEW JERSEY.

MOVABLE HOOD FOR STOVES OR RANGES.

SPECIFICATION forming part of Letters Patent No. 503,343, dated August 15, 1893.

Application filed January 24, 1893. Serial No. 459,577. (No model.)

*To all whom it may concern:*

Be it known that I, BENJAMIN F. CARPENTER, a citizen of the United States, residing at Roselle, Union county, New Jersey, have invented certain new and useful Improvements in Movable Hoods for Stoves and Ranges, fully described and represented in the following specification and the accompanying drawings, forming a part of the same.

The object of this invention is to furnish a means of effectually withdrawing the smoke, odors, vapor and heated air which rise from a cooking apparatus, and also to protect the cook from the greater part of the heat which is radiated therefrom; and reduce the temperature of the kitchen and other rooms when desired. Also to facilitate cooking operations, heating irons, baking, &c., by confining the heat for the various operations to the stove instead of allowing it to escape by radiation. Also to economize fuel by such improved application of the heat, also for confining the heat and conducting it to other rooms if desired.

My improvements are applicable to any cooking apparatus, whether it consists in a brick set range which is fitted partly into a recess in a chimney breast, a detached range which is set adjacent to the chimney breast, or a stove which is set some distance from the chimney breast into the apartment.

For convenience, I have used the term "range" herein to include all forms of cooking apparatus.

My invention consists in the particular means hereinafter set forth, by which a counterbalanced hood is applied to inclose the top of the stove, and is furnished with an extensible connection to the ventilating flue. By such extensible connection the hood may be drawn downward to cover the cooking utensils and prevent the radiation of heat into the kitchen during the operation of cooking; and the hood is also fitted movably to guides and counterbalanced, so that it may be raised when access is required to the utensils, or the top of the range. The extensible connection consists in a movable curtain attached at the top to a spring roller, and at its bottom end to the edge of the hood. The guides provided at the edges of the hood form, with the curtain and the hood, a passage extending from the bottom of the hood upward to the ventilating flue, which flue is thus in constant connection with the hood. The guides furnish the sides of such passage, while the curtain furnishes the front of the same, and the rear of the passage is closed in any suitable manner, depending upon the location of the range. Where the range is brick set, the brick wall of the chimney breast furnishes the back of the passage, but where the range is detached, a supplemental wall of wood or metal may be supported upon the range to form the rear wall of the passage; the guides in either case being affixed to the front of the wall, to form the sides of the ventilating passage. A ventilating flue is connected with the passage which lies between the rear wall and the curtain, and the curtain thus forms an extensible connection between the hood and the flue.

The invention will be understood by reference to the annexed drawings, in which—

Figure 1:
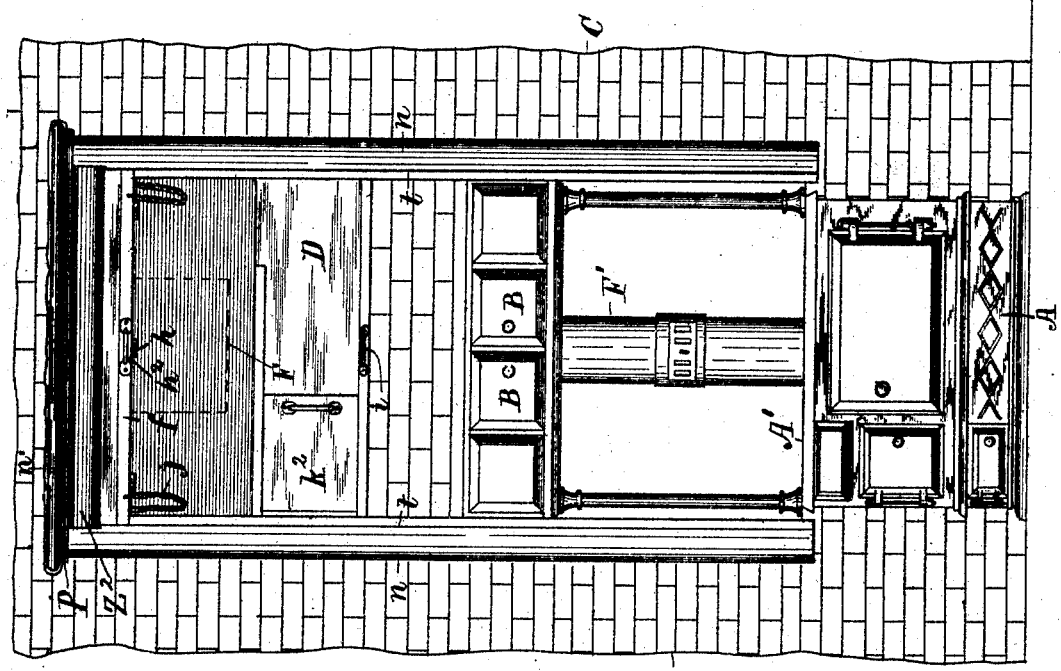
Figure 4:
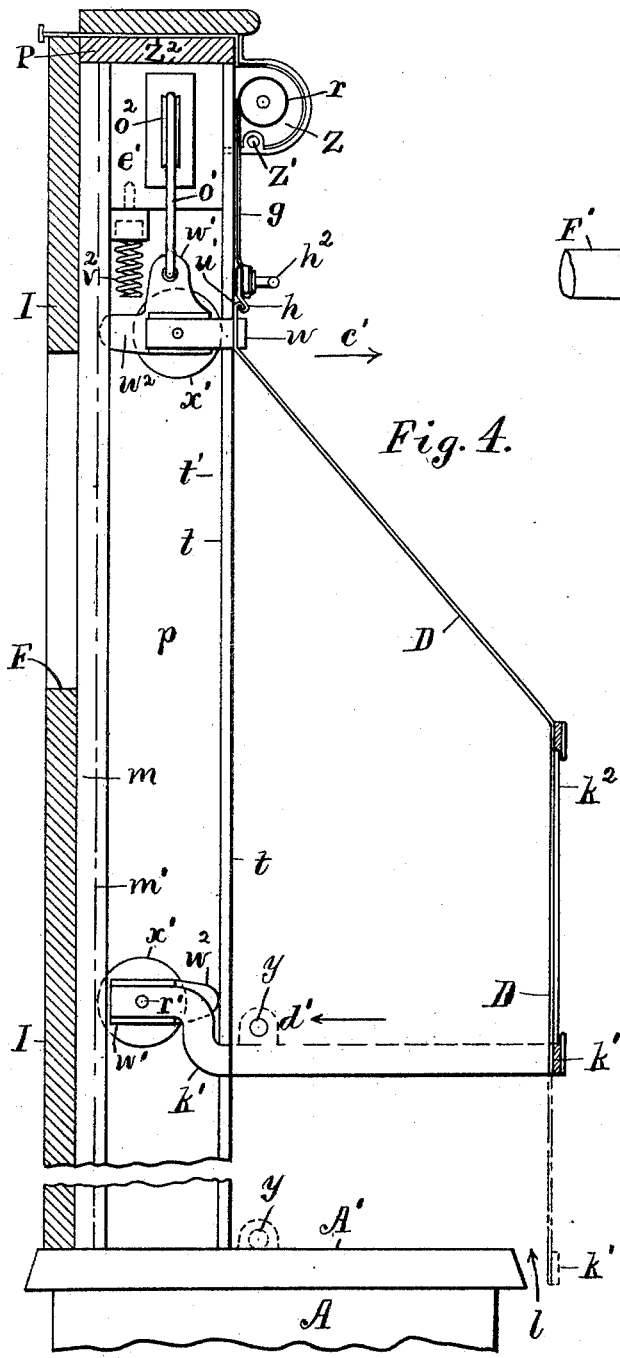
Figure 3:
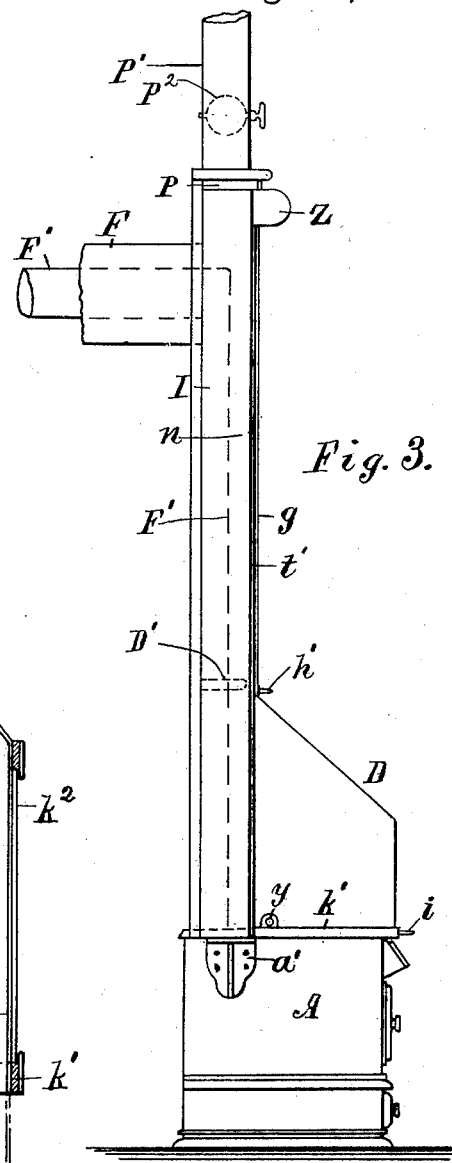

Figure 1 is a front elevation of a brick set range with my improvements applied thereto. Fig. 2 is a front elevation of a detached range with the same improvements. Fig. 3 is an edge view of the parts shown in Fig. 2. Fig. 4 is a sectional elevation of the hood with the rear wall, and guides for supporting the same. Fig. 5 is a plan of the fixtures with the top covering removed, and the guides in section on line $x, x$, in Fig. 6, the frame $k'$ of the hood being also added to the figure. Fig. 6 is a front elevation of the top of the fixtures with the curtain and curtain fixtures broken away at the end; and Fig. 7 is an end view of the curtain roll and curtain.

In the brick set range shown in Fig. 1, the range top A is shown; with hot closets B supported above the same.

C designates the chimney breast or brick setting of the range, which forms the rear wall of the ventilating passage I'; and the guides $t'$ are affixed to the front of such wall.

In Figs. 2, 3 and 4, the supplemental wall is supported upon a detached range, and the guides are in like manner attached to the front of the same. The supplemental wall lettered I in Figs. 3 and 4, is shown of sufficient thickness to be formed of wood, and may be fire-proofed as hereinafter set forth; but as such part of the structure serves merely as the rear wall of the passage, it may be made of sheet metal or any suitable material. The remaining parts of the construction would be the same, whether applied to a range set in brick work, or to a detached range, the guides being surmounted by a top P adapted to close the passage I' at the upper end, and the outer sides of the guides being provided with vertical pockets $n$ to receive weights for balancing the hood.

A casing $Z^2$ is shown beneath the front of the top P, to close part of the passage, and to incase a spring roller $r$ to which the curtain $g$ would be attached. The curtain is shown provided at the bottom end with a bar $f$ which is shown connected detachably to the top of the hood D by hooks $h$. The front of the hood is formed with a vertical plate to form an aperture adapted to furnish access to the top of the range; for broiling, or other culinary operations, and for heating irons for laundry purposes. A sliding door $k^2$ is fitted to such vertical plate to close the aperture when desired. A handle $i$ is affixed to the front of the vertical plate to raise and lower the hood, and a handle $h^2$ is fixed upon the curtain bar $f$ to detach the curtain from the hood and to raise and lower the curtain independently. Chains $j$ are shown attached to the bar $f$ and to the top of the hood to limit the separation of the same.

The hood is shown elevated in Fig. 1, with the curtain attached thereto, exposing the entire top of the range as well as the ovens or hot closets B; but the hood is shown drawn downward in Fig. 2, with the bottom frame $k'$ of the hood inclosing the top of the range.

The means for disengaging the curtain from the hood is shown in Fig. 4, where the top of the hood is shown furnished with a downwardly bent flange $u'$ with which the hooks $h$ are readily engaged by manipulating the handle $h^2$. With the use of a spring roller $r$, a constant tension is exerted upon the curtain, which serves to keep the hooks engaged with the flange, and thus connects the hood and curtain, except when the curtain is intentionally detached. When thus detached the weight of the hood is substantially balanced by the weights $o$, so that either the curtain or hood may be moved independently. Shelves D' may be fixed above the range as shown in Fig. 3, and the disconnection of the curtain from the hood affords access to such shelves or to the closets or elevated ovens, when the hood is drawn down, as shown in Fig. 2, as the curtain in such case may be detached from the hood and lifted by the spring roller as far as the chains will allow. The chains may be adjusted to fully expose the closets or ovens B, as shown in Fig. 2, and when access to the closets is not required, the curtain may be again drawn down and engaged with the top of the hood, to wholly inclose the passage leading to the ventilating flue F.

The hood is preferably made of sheet iron with bar $k'$ around the bottom, and bar $w$ around the top, to stiffen the same, and act as frames; the ends of the bars being extended backward to form supports for anti-friction wheels, and the bottom bar is bent to fit outside the top $a'$ of the range, to leave a narrow air space $l$ between the two, as shown at the bottom of Fig. 4. In this figure, the hood is shown in dotted lines in its lowest position, the guides and rear walls I being broken for want of space upon the drawings.

In Figs. 4, 5 and 6, the rear wall I is shown as supplemental to the detached range, and formed with the flue aperture F passing through the same, and with all the fixtures attached to such wall I, for guiding and counterbalancing the hood.

Wooden plates $m$ are shown attached to the wall I, and provided with sheet iron casings $n$ to form pockets to conceal the weights $o$, which are connected by cords $o'$ to the frame of the hood. The partition upon the inner side of each pocket is formed by a sheet metal strip $p$ secured to the plate $m$ by flange $p'$ and bent at its front side into a channel to embrace the front guide $t$.

A groove $m'$ which constitutes the rear guide is formed in the plate $m$, and anti-friction wheels $x$, $x'$, are attached to the bars $k'$ and $w$ of the hood by bolts $r'$ projected through the ends of such bars. The outer sides of the wheels $x'$ run in contact with shoulders $t'$ which are formed in the rear guide by the side of the groove $m$, and upon the front guide by a rib formed upon the wooden strip $t$. By this construction the hood is guided in every direction, while the wheels are kept entirely from contact with the sheet metal, which I have found by experience produces a harsh and grating sound. To prevent such sound, I prefer to employ a comparatively non-resonant material like wood for the guides. Such wood although resonant in many situations, operates completely to deaden the vibrations which would be imparted to the sheet metal by the movement of the wheels. When made of wood, the rear wall and guides may be readily fire-proofed by suitable chemical solutions. The curtain may also be made of any suitable woven fabric, and fire-proofed by means already well known, so as to endure the heat to which it is exposed without injury.

The weights $o$ may be suspended by fire-proof cord or by metal band or chain. The bars $w$ and $k'$ are extended backward from the sides of the hood into proximity to the guides, and the ends of the bars are provided with trolleys $w'$ carrying the wheels $x'$, and from which lugs $w^2$ are projected toward the opposite guides and sufficiently near to their surfaces to limit backward or forward movement when accidental pressure is applied.

A buffer spring $v^2$ is affixed to the block $e'$ to contact with the lug $w^2$, when the hood is raised, and to thus bring it to rest without shock, as shown in Fig. 4.

In Figs. 3 and 4 stops $y$ are shown applied near the bottom of the hood, and when the hood is drawn down, it is arrested by the contact of the stops with the top of the range or stove. As the entire weight of the hood is supported back of the center of gravity, the pressure is forward at the upper end of the hood, as indicated by the arrow $c'$ in Fig. 4, and backward at the lower end of the hood, as indicated by the arrow $d'$. The upper wheel $x'$ therefore runs in contact with the front guide $t$, while the lower wheel $x$ presses into the groove $m'$. The cord $o'$ is attached to the upper trolley and carried over pulley $o^2$ which is fixed in a block $e'$ at the top of the partition $p$; the weight rising and falling in the pocket $n$ upon the outer side of such partition. The spring roller $r$ is mounted in brackets Z which are affixed to the front of the guides, and to a board P which closes the top of the pockets $n$ and the space between the guides. The brakets are tied together at their lower ends by a bolting rod $Z'$, and are curved externally and provided with a flange $u$ to retain a sheet metal casing $Z^2$, which is extended over the top of the board P into contact with the back piece. If the rear wall of the passage be of brick work, as in a brick set range, the edge of the sheet metal $Z'$ may be scribed so as to fit the irregularities of the same and thus form a close joint. The casing $n$ of the pockets is attached at its front edge to the partition $p$, and at its rear edge to the margin of the wooden plate $m$, and its back edge may also be scribed to fit brick work if required. Where the surface is so rough as to require a more perfect joint than can be made by scribing sheet metal, I use a packing $n'$ of soft material, like felt, which is fire-proofed and fastened to the edge of the sheet metal or between the same and the wall. Bolts $r'$ are shown for connecting the plates $m$ with the rear wall. Such rear wall may, as stated above, be made of wood fire-proofed, or of sheet metal suitably stiffened.

The supplemental wall and guides may be suported upon the range by brackets $a'$, shown in Figs. 2 and 3, and the tops of the guides steadied by braces extended to the ceiling or sides of the room.

The aperture of the ventilating flue is usually formed through the rear wall and connected with the ventilating passage $I'$ between the guides and below the top piece P; but in some instances the connection is made through such top piece. In some instances the smoke pipe $F'$ of the range may be extended upward in front of the rear wall to the ventilating flue F and extended through the same as shown in Fig. 3, as is sometimes done where stationary hoods are fixed upon the upper part of the chimney breast.

The curtain is arranged to move in contact with the front sides of the guides so that the passage $I'$ inclosed by the guides and curtain forms an extensible connection between the hood and the flue, which is maintained both when the hood is elevated, and when it is drawn downward over the top of the range. The curtain is shown in the drawings lapped at its edges over the face of the front guides, and forms a joint therewith by the indraft of the flue, when the damper in such flue is open. By this construction the curtain is adapted to relax and allow the heated air to escape into the kitchen when the damper of the flue is closed. The heated air may thus be retained in the kitchen to warm the same, as in cold weather; while the hood operates the same as in hot weather to intercept the radiant heat from the cook. The room may thus be kept comfortable and the cook entirely protected from the intense heat of the range itself.

The hood is shown herein fitted to the entire top of the range, as such construction is the most desirable where the heat is objectionable; but it is obvious that it may, if desired, be confined to a part only of the apparatus; or, as with very wide ranges, such as are used in hotels or ships, the hood may be divided into sections, in which case, two or more separate hoods would be operated side by side; thus exposing but a part of the range at one time.

It is obvious that springs may be substituted for the weights $o$ to balance the hood, as is common in balancing window sashes. The smoke pipe $F'$ may, if desired, be conducted through the ventilating flue F, and such an arrangement is shown in the detached range in Figs. 2 and 3.

It is common to furnish all such ventilating flues with a damper or register to close the same at pleasure as shown at R in Fig. 5, and I have termed such device a damper in the claims attached hereto. It is obvious that when the stove is not in use for cooking, and is therefore free from odors, the heated air from the hood may be used for an upper apartment. For such purpose the ventilating flue may be connected with an upper apartment, or a pipe may be taken from the top P. A pipe $P'$ is shown extended from the top T, in Fig. 3, to indicate such a connection, and a damper $P^2$ is shown inserted in such pipe to close the same, when the range is used in cooking, and the odors from the range would be offensive.

Having thus set forth my invention, what I claim is—

1. The combination, with a range, of a wall adapted to form the rear of a ventilating passage, guides upon the front of such wall forming the sides of such passage, an outlet flue for such passage, a hood fitted movably to such guides with means to counterbalance and raise the hood, a spring curtain roll mounted at the top of the guides and a curtain fitted movably upon the guides and attached to the top of the hood, as set forth.

2. The combination, with a range, of a wall adapted to form the rear of a ventilating passage, guides upon the front of such wall forming the sides of such passage, an outlet flue in such wall between the guides, a hood fitted movably to such guides with cords and weights to balance the same, a spring curtain roll mounted at the top of the guides and a curtain fitted movably upon the guides and provided at the bottom with a stiffening bar having a handle and means to engage the top of the hood, as set forth.

3. The combination, with a range, of a wall adapted to form the rear of a ventilating passage, an outlet flue in such wall, vertical guides upon the front of such wall, a hood movable to and from the top of the range upon such guides, and a top piece and flexible curtain for inclosing the passage between the guides, substantially as herein set forth.

4. The combination, with a range, of a wall adapted to form the rear of a ventilating passage, an outlet flue in such wall, vertical guides upon the front of such wall, a hood movable to and from the top of the range upon such guides, a top piece and flexible curtain for inclosing the passage between the guides, and a damper in such outlet flue, as set forth.

5. The combination, with a range, of a wall adapted to form the rear of a ventilating passage, an outlet flue in such wall, vertical pockets attached to such wall with guides at their inner and outer edges and a counterbalanced hood fitted to the guides at the outer edges, with wheels at its top and bottom fitted to the guides, as herein set forth.

6. The combination, with a range, of a wall adapted to form the rear of a ventilating passage, an outlet flue in such wall, wooden plates $m$ provided with grooves $m'$ and attached to the wall as described, vertical pockets $n$ secured upon the plates, wooden guides attached to the outer edges of the pockets, a hood fitted to the outer guides with wheels fitted to such outer guides and to the grooves $m'$, and means for counterbalancing and raising the hood, substantially as set forth.

7. The combination, with a range, of a wall adapted to form the rear of a ventilating passage, an outlet flue in such wall, wooden plates $m$ provided with grooves $m'$ and attached to the wall as described, vertical pockets $n$ secured upon the plates, wooden guides attached to the outer edges of the pockets, a hood fitted to the outer guides, trolleys projected back from the opposite edges of the hood, the wheels $x$, and $x'$, pivoted upon the trolleys, the pulleys $o^2$ at the tops of the pockets, the cords $o'$ attached to the trolleys and carried over the pulleys, and the weights $o$ for counterbalancing the hood, as herein set forth.

8. The combination, with a range or stove, of a wall adapted to form the rear of a ventilating passage, an outlet flue in such wall, vertical guides $t$ and $m$ of non-resonant material attached to the wall, a hood movable to and from the top of the stove with wheels fitted to such guides, and an extensible connection to the outlet flue, substantially as herein set forth.

9. The combination, with a range or stove, of a wall adapted to form the rear of a ventilating passage, an outlet flue in such wall, guides upon the front of the wall, a hood fitted movably to such guides, a top piece and curtain for inclosing the chamber between the guides, and a packing inserted between the wall and the guides, substantially as set forth.

10. The combination, with a range or stove, of a wall adapted to form the rear of a ventilating passage, an outlet flue in such wall, guides upon the front of the wall, a hood counterbalanced and fitted movably to such guides, a spring curtain roll mounted at the top of the guides, a curtain fitted movably upon the guides, and detachably connected at the bottom of the hood, and chains or cords for limiting the separation of the curtain and hood, as set forth.

11. The hood fixtures for a range or stove, consisting of the wooden plates $m$ adapted for attachment to a chimney breast and provided with suitable guides and vertical pockets $n$, the top piece P, the curtain roller $r$, the curtain $g$, the hood movable upon the guides, and the means, as cords and weights for balancing the hood, substantially as set forth.

12. The hood fixtures for a stove or range, consisting of the wooden plates $m$ adapted for attachment to a chimney breast and provided with the grooves $m'$, the sheet metal partition P, the guide $t$, and the metallic pocket $n$ having its edge adapted to scribing upon the brick work, the top piece $p$, the curtain roller $r$, the curtain $g$, the hood movable upon the guides, and the cords and weights for balancing the hood, as set forth.

13. The hood fixtures for a range or stove, consisting of the wooden plates $m$ adapted for attachment to a chimney breast, and provided with suitable guides and vertical pockets $n$, the top piece P, the curtain roller $r$, the curtain $g$, the hood movable upon the guides, the cords and weights for balancing the hood, and the plates, guides, curtain, and all combustible parts being chemically treated to render them incombustible, as set forth.

14. The combination, with a range, of a supplemental wall supported by the range to form the rear of a ventilating passage, guides attached to the range and to the front side of such wall, a hood movable vertically upon the guides, and outlet flue in the wall and an extensible connection from the hood to such outlet flue, as set forth.

In testimony whereof I have hereunto set my hand in the presence of two subscribing witnesses.

BENJAMIN F. CARPENTER.

Witnesses:
L. LEE,
THOMAS S. CRANE.